United States Patent
Saito

(10) Patent No.: US 7,214,732 B2
(45) Date of Patent: May 8, 2007

(54) THERMOPLASTIC RESIN COMPOSITION AND METHOD OF IMPROVING APPEARANCE

(75) Inventor: Akihiro Saito, Tochigi-ken (JP)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 10/356,876

(22) Filed: Feb. 3, 2003

(65) Prior Publication Data

US 2003/0162871 A1    Aug. 28, 2003

(30) Foreign Application Priority Data

Feb. 8, 2002 (JP) .............................. 2002-033052

(51) Int. Cl.
*C08K 5/42* (2006.01)
(52) U.S. Cl. ...................................... 524/265; 524/912
(58) Field of Classification Search ................ 524/165, 524/912
See application file for complete search history.

(56) References Cited

U.S. PATENT DOCUMENTS 5,606,007 A    2/1997  Sakashita et al. ........... 528/176
6,090,907 A    7/2000  Saito et al. .................. 528/198
6,194,497 B1   2/2001  Willems et al. ............. 524/165

FOREIGN PATENT DOCUMENTS

| EP | 0 309 622 A | 4/1989 |
|---|---|---|
| EP | 0 435 124 B1 | 4/1997 |
| EP | 0 897 950 A | 2/1999 |
| EP | 0 905 183 A | 3/1999 |
| EP | 1 256 600 A | 11/2002 |
| WO | WO 01 44363 A | 6/2001 |

OTHER PUBLICATIONS

Database WPI, Derwent Abstract, JP 08 302165A, Mitbusishi Rayon Co., Ltd., Nov. 19, 1996.
PCT International Search Report for International Application No. PCT US/ 03/0333, International filing date, Feb. 4, 2003.

*Primary Examiner*—Peter Szekely
(74) *Attorney, Agent, or Firm*—Marina, Larson & Associates, LLC

(57) ABSTRACT

To present a thermoplastic resin composition that gives a molded product with a surface to which dust is less likely to adhere. This patent presents a method of improving the appearance of the surface of a thermoplastic molded product.

11 Claims, 1 Drawing Sheet

THERMOPLASTIC RESIN COMPOSITION AND METHOD OF IMPROVING APPEARANCE

The present application is a U.S. non-provisional application based upon and claiming priority from Japanese Application No. 2002-33052, with a filing date of Feb. 8, 2002, which is hereby incorporated by reference.

BACKGROUND

The invention relates to the thermoplastic resin composition, which is excellent in preventing sticking of dust. It is also related to the method of improving fern marks of molded products.

When a molded product of thermoplastic resin is left attended, it shows fern marks due to the external speck, as shown in FIG. 1. This fern marks often reduces the value of the plastic product.

OBJECTIVE OF THE INVENTION

The objective of this invention is to solve this problem. Thus this invention aims at providing a thermoplastic resin composition that enables manufacturing of the molded product whose surface is difficult to be soiled due to dust. Precisely, the objective of the invention is to provide a thermoplastic resin composition that enables manufacturing of the molded product which does not show fern marks as shown in FIG. 1, even after keeping the molded plastic article unattended.

Further, the objective of the invention is to provide a method for improving the appearance (shown in FIG. 1) of the thermoplastic resin molded product.

SUMMARY OF THE INVENTION

Thermoplastic resin composition of the invention is characterized by comprising 0.0001 to less than 0.05% by weight of halogenated carbon sulfonate of polysubstituted phosphonium compound per 100% by weight of the thermoplastic resin.

In a further embodiment, the invention relates to a thermoplastic resin composition characterized by comprising 0.0001 to less than 0.001% by weight of halogenated carbon sulfonate of polysubstituted phosphonium compound per 100% by weight of the thermoplastic resin.

It is preferred that the above mentioned halogenated alkyl sulfonate of polysubstituted phosphonium compound is sulfonic acid phosphonium compound represented by the following formula (1).

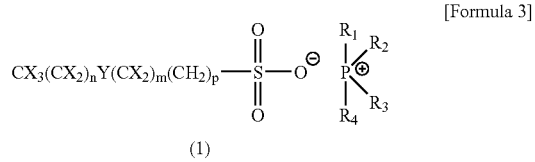

(1)

Wherein, X is selected from a group of halogen and hydrogen where X may or may not be the same (however, at least one of the X is halogen), n, m and p are integers between 0 and 12, Y is either absent or it is selected from a group consisting of heterocyclic group, nitrogen, oxygen, sulfur, selenium, phosphorous and arsenic, $R_1$, $R_2$ and $R_3$ may be the same or different, and are selected from aliphatic hydrocarbon with 1 to 8 carbon atoms and aromatic hydrocarbon with 6 to 12 carbon atoms and $R_4$ represents hydrocarbon with 1~18 carbon atoms.

It is preferred that X of above mentioned halogenated alkyl sulfonate of polysubstituted phosphonium compound of formula (1) is fluorine. Moreover, it is preferable if n is 3 and $R_1$, $R_2$ and $R_3$ and $R_4$ are alkyl groups with 4 carbon atoms respectively, Y is absent and m and p are 0.

It is preferred that the above mentioned thermoplastic resin is selected from the group consisting of aromatic polycarbonate, polyetherimide, polyester, polyphenylene ether, polyphenylene ether/styrene polymer blend, polyamide, polyketone, acrylonitrile-butadiene-styrene, their blends and their blends with other substances. Specifically, aromatic polycarbonate resin is suitable. The aromatic polycarbonate resin prepared by fusion method is preferred.

In the method for improving the appearance of the molded product of this invention, the halogenated carbon sulfonate of polysubstituted phosphonium compound should be added 0.0001 to 0.05% by weight to 100% by weight of the thermoplastic resin.

DETAILED DESCRIPTION

Thermoplastic resin composition of the invention is described below. Thermoplastic resin composition of the invention comprises 0.0001 to 0.05% by weight halogenated carbon sulfonate of polysubstituted phosphonium compound (for improvement of fern marks) to 100% by weight of the thermoplastic resin.

In a further embodiment, the invention relates to a thermoplastic resin composition characterized by comprising 0.0001 to less than 0.001% by weight of halogenated carbon sulfonate of polysubstituted phosphonium compound per 100% by weight of the thermoplastic resin.

Thermoplastic Resin

The well known thermoplastic resins can be used without any restriction. For example, aromatic polycarbonate, polyetherimide, polyester, polyphenylene ether, polyphenylene ether/styrene polymer blend, polyamide, polyketone, acrylonitrile-butadiene-styrene and their blends.

Amongst the all, aromatic polycarbonate is preferred. Carbonate resins, generally, comprises of repeating structural units of the following formula (1)

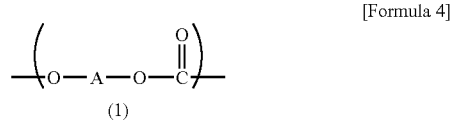

(1)

Wherein, A is a bivalent residual group derived from an aromatic dihydroxy compound.

As aromatic dihydroxy compounds, mononuclear or polynuclear aromatic compound containing 2 hydroxy groups as functional group, wherein each hydroxy group is directly bonded to an aromatic carbon.

The concrete example of aromatic dihydroxy compound is bisphenol compound represented by the following formula (2).

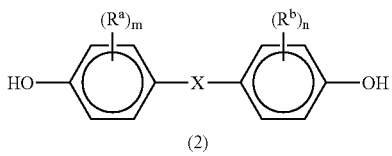

[Formula 5]

(Where, $R^a$ and $R^b$ represent halogen or monovalent hydrocarbon group. These groups may be the same or different. m and n are integers 0 to 4.

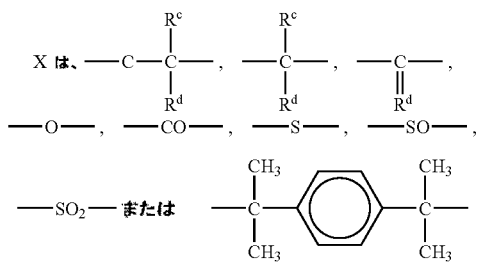

$R^c$ and $R^d$ are hydrogen or monovalent hydrocarbon group. $R^c$ and $R^d$ may have ring structure and $R^e$ is bivalent hydrocarbon group).

The concrete examples of aromatic dihydroxy compound represented by formula (2) are: bis(hydroxyaryl) alkane, such as bis(4-hydroxyphenyl) methane, 1,1-bis(4-hydroxyphenyl) ethane, 2,2-bis(4-hydroxyphenyl) propane (or bisphenol A), 2,2-bis(4-hydroxyphenyl) butane, 2,2-bis(4-hydroxyphenyl) octane, bis(4-hydroxyphenyl) phenylmethane, 2,2-bis(4-hydroxy-l-methylphenyl) propane, 1,1-bis(4-hydroxy-t-butylphenyl) propane, 2,2-bis(4-hydroxy-3-bromophenyl) propane, 2,2-(4-hydroxy-3,5-dibromophenyl) propane; bis(hydroxyaryl) cycloalkane, such as 1,1-bis(4-hydroxyphenyl) cyclopentane, 1,1-(4-hydroxyphenyl) cyclohexane; dihydroxy arylether, such as 4,4'-dihydroxy diphenylether, 4,4'-dihydroxy-3,3'-dimethyl phenylether; dihydroxydiaryl sulfides, such as 4,4'-dihydroxydiphenylsulfide, 4,4'-dihdyroxy-3,3'-dimethylphenylsulfide; dihydroxydiarylsulfoxides, such as 4,4'-dihydroxydiphenylsulfoxide, 4,4'-dihydroxy-3,3'-dimethyldiphenyl sulfoxide; dihydroxydiarylsulfones, such as 4,4'-dihydroxyphenylsulfone, 4,4'-dihydroxy-3,3'-dimethyldiphenylsulfone. The compounds are not limited to these examples.

Out of these, 2,2-bis(4-hydroxyphenyl) propane (bisphenol A) is especially preferable.

Further, aromatic dihydroxy compound other than formula (2), aromatic dihydroxy compounds represented by the following formula (3) can be used.

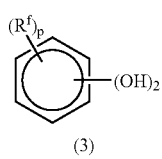

[Formula 6]

Wherein, $R^f$ independently represent hydrocarbon group with 1 to 10 carbon atoms, one or more of these hydrocarbon groups is halogenated hydrocarbon group or, halogen atom, p is an integer 0 to 4.

Examples of such compounds are resorcin; substituted resorcin, such as 3-methylresorcin, 3-ethylresorcin, 3-propylresorcin, 3-butylresorcin, 3-t-butylresorcin, 3-phenylresorcin, 3-cumylresorcin, 2,3,4,6-tetrafluororesorcin, 2,3,4,6-tetrabromoresorcin; catechol; hydroquinone and substituted hydroquinone, such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone.

Furthermore, aromatic hydroxy compound other than formula (2) can be represented by the following formula.

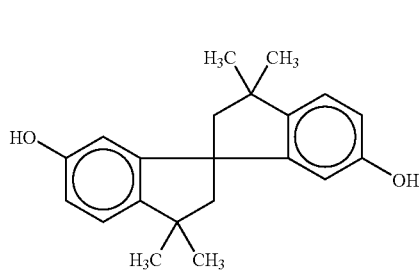

[Formula 7]

2,2,2',2'-tetrahydro-3,3,3',3'-tetramethyl-1,1'-spirobi-[1H-indane]-7,7'-diol can also be used.

These aromatic dihydroxy compounds can be used individually or as a combination of at least two.

Polycarbonate resin synthesized by transesterification reaction between aromatic dihydroxy compound and carbonate precursor (such as carboxylate diester) in molten state is suitable for this invention. (This method is known as fusion method).

Examples of carbonate diester that can be used in fusion method are diphenyl carbonate, bis(chlorophenyl) carbonate, bis(2,4-dichlorophenyl) carbonate, bis(2,4,6-trichlorophenyl) carbonate, bis(2-cyanophenyl) carbonate, bis(o-nitrophenyl) carbonate, ditoluyl carbonate, m-cresyl carbonate, dinaphthyl carbonate, bis(diphenyl) carbonate, diethyl carbonate, dimethyl carbonate, dibutyl carbonate and dicyclohexyl carbonate. Amongst the all, diphenyl carbonate is preferred. Two or more can be used simultaneously. Specifically, diphenyl carbonate is preferred. Dicarboxylic acid or dicarboxylate ester may also be present in the carboxylate diesters. Specifically the carbonate ester may contain up to 50 mol % or, preferably up to 30 mol % dicarboxylic acid or dicarboxylate ester.

Examples of such dicarboxylic acid or dicarboxylate esters are terephthalic acid, isophthalic acid, sebacic acid, decanedioic acid, dodecanedionic acid, diphenyl sebacate, diphenyl terephthalate, diphenyl isophthalate, diphenyl decanoate and diphenyl dodecanoate. Atleast two of dicarboxylic acids or dicarboxylates can be used together.

When the above carboxylate ester and above mentioned aromatic dihydroxy compound are polymerized, the polycarbonate is obtained. In the preparation of polycarbonate, the amount of carboxylate ester is 0.95 to 1.30 mole, preferably 1.01 to 1.20 mole per 1 mole of aromatic dihydroxy compound.

In the fusion method, a catalyst suggested in Patent No. JP4-175368 can be used. Specifically, alkali metal compound and/or alkaline earth metal compound (hereafter mentioned as alkali (earth) metal compound (a), can be used as melt polycondensation catalyst.

Organic acid salts, inorganic acid salts, oxides, hydroxide or alcoholate of alkali metals and alkaline earth metals can be preferably used as alkali (earth) metal compounds (a).

The concrete examples are sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, potassium borohydride, sodium benzoate, potassium benzoate, lithium benzoate, disodium hydrogenphosphate, dipotassium hydrogenphosphate, dilithium hydrogen phosphate, sodium salt and dipotassium salt of bisphenol A, sodium, potassium and lithium salts of phenol.

Examples of alkaline earth compounds are calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate. Two or more of these can be used in combination.

The quantity of such alkali (earth) metal compound is $1\times10^{-8}$ to $1\times10^{-3}$ mole, preferably $1\times10^{-7}$ to $2\times10^{-6}$ mole and still preferably $1\times10^{-7}$ to $8\times10^{-7}$ mole per mole of bisphenol in melt polycondensation reaction. When alkali (earth) metal compound is included in bisphenol raw material, it is better to control the quantity of addition of alkali (earth) metal compound with respect to 1 mole of bisphenol, in the melt polycondensation reaction so as to be in the above-mentioned range.

In addition to the catalyst alkali (earth) metal compound (a), a basic compound (b) can also be used for melt polycondensation.

Examples of such basic compound (b) are nitrogen containing degradable and volatile basic compounds at high temperature. Specific examples are as given below.

Ammonium hydroxide containing alkyl, aryl, alkaryl groups like tetramethyl ammonium hydroxide ($Me_4NOH$), tetraethyl ammonium hydroxide ($Et_4NOH$), tetrabutyl ammonium hydroxide ($Bu_4NOH$) and trimethyl benzyl ammonium hydroxide ($\phi$-$CH_2(Me)_3NOH$). Tertiary amines like trimethylamine, triethylamine, dimethylbenzylamine, and triphenylamine; secondary amines like $R_2NH$ (wherein, R is alkyl group like methyl, ethyl or aryl group like phenyl or tolyl); primary amines $RNH_2$ (R is the same as above); pyridines like 4-dimethyl aminopyridine, 4-diethyl aminopyridine, 4-pyrolidinopyridine; imidazole like 2-methylimidazole, 2-phenylimidazole; basic compounds, such as ammonia, tetramethyl ammonium borohydride ($Me_4NBH_4$), tetrabutyl ammonium borohydride ($Bu_4NBH_4$), tetrabutyl ammonium tetraphenyl borate ($Bu_4NBPh_4$), tetramethyl ammonium tetraphenyl borate ($Me_4NBPh4$).

Out of these, tetra alkyl ammonium hydroxide is preferred.

The amount of above nitrogen contained compound (b) is $1\times10^{-6}$ to $1\times10^{-1}$ mole, preferably $1\times10^{-5}$ to $1\times10^{-2}$ mole per mole of bisphenol A.

As a catalyst, borate (c) can also be used.

As borate (c), boric acid and ester of boric acid are also listed.

Boric acid ester is expressed by the following general formula.

$$B(OR)_n(OH)_{3-n}$$

Wherein, R is alkyl group like methyl, ethyl or, aryl group like phenyl, n is 1,2 or 3.

Specific examples of the boric acid ester are trimethylborate, triethylborate, tributylborate, trihexylborate, triheptylborate, triphenylborate, tritolylborate and trinaphthylborate.

The amount of boric acid or boric acid ester (c) that can be added per mol of bisphenol is $1\times10^{-8}$ to $1\times10^{-1}$ mole, preferably $1\times10^{-7}$ to $1\times10^{-2}$ and most preferable range is $1\times10^{-6}\sim1\times10^{-4}$ mole.

A combination of alkali (earth) metal compound (a) and nitrogen containing basic compound (b) or a combination of alkali (earth) metal compound (a), nitrogen containing base (b) and boric acid or boric acid ester (c) can be used as the melt polycondensation catalyst.

When combination of alkali (earth) metal compound (a) and nitrogen containing basic compound (b) is used as a catalyst, the polycondensation reaction can take place at an adequate rate and a high molecular weight polycarbonate can be obtained with a high polymerization activity.

Further, when a combination of alkali (earth) metal compound (a) and nitrogen containing base (b) is used or a combination of alkali (earth) metal compound (a), nitrogen containing base (b) and boric acid or boric acid ester (c) is used, each catalyst can be mixed and then added to the fused mixture of bisphenol and carboxylic acid ester. Alternatively, the catalysts can be added separately to the fused mixture of the bisphenol and carboxylic acid ester.

Halogenated Carbon Sulfonate of Polysubstituted Phosphonium Compound

Alkyl sulfonate phosphonium compound represented by the following formula (1) is the preferred halogenated carbon sulfonate of polysubstituted phosphonium that can be used in the invention.

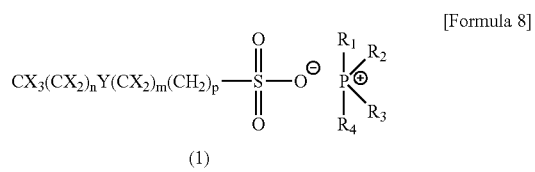

(1)

Wherein, X is selected from a group of halogen and hydrogen where X may or may not be the same (however, at least one of X is halogen), n, m and p are integers between 0 and 12, Y is either absent or is selected from a group consisting of heterocyclic group, nitrogen, oxygen, sulfur, selenium, phosphorous and arsenic, $R_1$, $R_2$ and $R_3$ may be the same or different, and are selected from aliphatic hydrocarbon with 1 to 8 carbon atoms and aromatic hydrocarbon with 6 to 12 carbon atoms and $R_4$ represents hydrocarbon with 1 to 18 carbon atoms.

It is desirable that X in the halogenated carbon sulfonate of polysubstituted phosphonium compound of formula (1) is fluorine. Moreover, it is preferred that n is 3 and $R_1$, $R_2$, $R_3$ and $R^4$ are alkyl groups with 4 carbon atoms respectively, Y is absent and m and p are 0.

In other words, fluorosulfonate phosphonium comprising fluorocarbon containing organic sulfonic acid anion and organic phosphonium cation, is preferred.

Examples of organic sulfonic acid anion are perfluoromethanesulfonate, perfluorobutanesulfonate, perfluorohexanesulfonate, perfluoroheptane sulfonate and perfluorooctanesulfonate. Examples of phosphonium cation are aliphatic phosphonium, such as tetramethylphosphonium, tetraethylphosphonium, tetrabutylphosphonium, triethylmethylphosphonium, tributylmethylphosphonium, tributylethylphosphonium, trioctylmethylphosphonium, trimethylbutylphosphonium, trimethyloctylphosphonium, trimethyllaurylphosphonium, trimethylstearylphosphonium and triethyloctyl phosphonium and aromatic phosphonium, such as tetraphenyl phosphonium, triphenylmethyl phosphonium, triphenylbenzylphosphonium and tributylbenzyl phosphonium.

The fluorosulfonate phosphonium of the invention can be obtained by combining organic sulfonic acid anion and organic cation and there is no limit to the specific examples mentioned above.

The fluorosulfonate phosphonium can be prepared by blending corresponding sulfonic acid and phosphonium (IV) hydroxide in a mixed solvent and then evaporating the mixed solvent and can be obtained in pure state. For example, perfluorobutane sulfonate tetrabutyl phosphonium is obtained as follows. 98.6 g of perfluorobutane sulfonic acid, 200 ml 40% by weight solution of tetrabutylphosphonium hydroxide and 500 ml of a mixed solvent are fed into a flask and the mixture is stirred for 1 hour at room temperature. The sulfonate phosphonium separating out as an oily layer is separated and washed with 100 ml water. The solvent is evaporated using a vacuum pump and the compound with about 95% yield is obtained.

Fluorosulfonate phosphonium of the following general formula is preferred as sulphonate phosphonium.

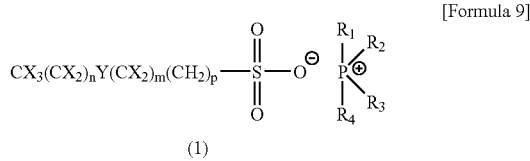

[Formula 9]

(1)

Wherein, n is an integer 1 to 12, $R_1$, $R_2$ and $R_3$ may or may not be the same and are aliphatic hydrocarbon with 1 to 8 carbon atoms or aromatic hydrocarbon with 6 to 12 carbon atoms.

Nonafluoro-1-butanesulfonate tetrabutylphosphonium salt of the following formula is especially preferable.

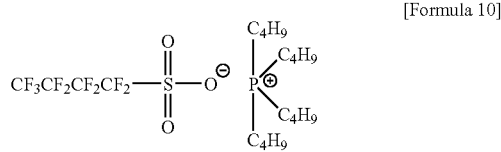

[Formula 10]

When the sulfonate phosphonium salt mentioned above is blended with a thermoplastic resin, a molded product with no fern marks on the surface is obtained. In other words, if this sulfonate phosphonium salt is added to a thermoplastic resin, the appearance can be improved.

Thermoplastic Resin Composition

The thermoplastic resin composition is characterized by containing 0.0001 to 0.05% by weight, preferably 0.001 to 0.03% by weight of halogenated carbon sulfonate of polysubstituted phosphonium to 100% by weight of thermoplastic resin as a soiling improving agent.

When the halogenated carbon sulfonate of polysubstituted phosphonium is present in the above ratio, a molded product with no fern marks on the surface can be obtained.

In Kokai no. 11-124465, regarding halogenated carbon sulfonate of polysubstituted phosphonium to thermoplastic resin "ratio sufficient to impart antistatic property to the molded product" has been mentioned. In the same patent (JP11-124465), the amount of addition of halogenated carbon sulfonate of polysubstituted phosphonium is 0.05 to 10% by weight on the basis of the total of the polymer and the additive.

However, the inventor conducted further study, it was observed that even if it is present in extremely little amount as stated in Kokai no. 11-124465, the fern marks on the surface of the molded product can be very much improved. If the amount is very little, the cost can also be kept low.

The following additives can be blended with the resin composition as long as they do not affect the objective of this invention: fire retardant like phosphate ester, organopolysiloxane; dripping preventing agents like polytetrafluoroethylene, pigments, dyes, heat resistant, stabilizers (antioxidants, phosphorus stabilizers, hindered phenol stabilizer, epoxy stabilizer), weather resistant (ultraviolet absorbent), slipping agent, mold lubricant, crystal-nucleating agent, plasticizers, fluidity improving agents, antistatic agents, inorganic fillers, inorganic and organic antibacterial agents.

The commercially available stabilizers (antioxidants) can be added without any restriction. The concrete examples of phosphorous stabilizers are phosphorous, triphenyl phosphite, diphenylnonylphosphite, tris-(2,4-di-t-butylphenyl) phosphite, trisnonylphenylphosphite, diphenyl isooctylphosphite, 2,2'-methylene bis(4,6-di-t-butylphenyl) octylphosphite, diphenyl-isodecyl phosphite, diphenylmono (tridecyl) phosphite, 2,2'-ethylidene-bis(4,6-di-t-butylphenol) fluorophosphite, phenyl-di-isodecylphosphite, phenyl-di-(tridecyl) phosphite, tris(2-ethylhexyl) phosphite, tris(i-sodecyl) phosphite, tris(tridecyl) phosphite, dibutyl hydrogen phosphite, tri-lauryl-tri-thiophosphite, tetrakis(2, 4-di-t-butylphenyl)-4,4'biphenylenediphosphite, 4,4'-isopropylidine phenolalkyl($C_{12} \sim C_{15}$) phosphite, 4,4'-butylidenebis(3-metyl-6-t-butylphenyl)di-tridecylphosphite, bis (2,4-di-t-butylphenyl) pentaerythritol diphosphite, bis (2,6-di-t-butyl-4-methylphenyl) pentaerythritol diphosphite, bis (nonylphenyl) pentaerythritol diphosphite, distearyl pentaerythritol diphosphite, phenyl bisphenolA-pentaerythritol diphosphite, tetraphenyl-di-propyleneglycoldiphosphite, 1,1,3-tris(2-methyl-4-di-tridecyl phosphite-5-t-butylphenyl) butane and 3,4,5,6-tetrabenzo-1,2-oxaphosphine-2-oxide.

This type of phosphorous stabilizer can be blended in the range of 0.0001 to 1 parts by weight, preferably 0.001 to 0.5 parts by weight per 100 parts by weight of the thermoplastic resin.

The concrete examples of hindered phenol stabilizers are n-octadecyl-3-(3',5'-di-t-butyl-4-hydroxyphenyl)propionate, 2,6-di-t-butyl-4-hydroxymethylphenol, 2,2'-methylene bis (4-methyl-6-t-butylphenol), and pentaerythrityl-tetrakis[3-(3'5'-di-t-butyl-4-hydroxyphenyl) propionate. These can be used separately or as combination of atleast two. Specific examples of hindered phenol antioxidants are n-octadecyl-3-(3',5'-di-t-butyl-4-hydroxyphenyl)propionate, 2,6-di-t-butyl-4-hydroxymethylphenol, 2,2'-methylenebis(4-methyl-6- t-butylphenol), and pentaerythritol-tetrakis[3-3',5'di-t-butyl-4-hydroxyphenyl) propionate. These can be used separately or as a combination of at least two.

The amount of hindered phenol stabilizer that can be blended with 100 parts by weight of the thermoplastic resin is in the range of 0.0001 to 1 part by weight, preferably 0.001 to 0.5 parts by weight.

The examples of epoxy stabilizers are epoxidized soybean oil, epoxidized linseed oil, phenyl glycidyl ether, allylglycidylether, t-butylphenylglycidyl ether, 3,4-epoxycyclohexylmethyl-3',4'-epoxycyclohexylcarboxylate, 3,4-epoxy-6-methylcyclo hexylmethyl-3',4'-epoxy-6'-methylcyclohexylcarboxylate, 2,3-epoxycyclo hexylmethyl-3',4'-epoxycyclohexylcarboxylate, 4-(3,4-epoxy-5-methylcyclo hexyl)-butyl-3',4'-epoxycyclohexylcarboxylate, 3,4-epoxycyclohexyl ethyleneoxide, cyclohexylmethyl-3,4-epoxycyclohexylcarboxylate, 3,4-epoxy-6-methylcyclehexylmethyl-6'-methylcyclo hexylcarboxylate, bisphenol A di-glycidylether, tetrabromobisphenol A glycidylether, glycidylether of phthalic acid, glycidyl ether of hexahydrophthalic acid, bis-epoxydicyclopentadienylether, bisepoxyethylene glycol, bis-epoxycyclohexyladipate, butadiene-epoxide, tetraphenylethylene-epoxide, octylepoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,3-dimethyl-3,4-epoxycyclohexyl carboxylate, N-butyl-2,2-dimethyl-3,4-epoxycyclohexylcarboxylate, cyclohexyl-2-methyl-3,4-epoxycyclohexylcarboxylate, N-butyl-2-isopropyl-3,4-epoxy-5-methylcyclohexylcarboxylate, octadecyl-3,4-epoxycyclohexylcarboxylate, 2-ethylhexyl-3',4'-epoxycyclohexylcarboxylate, 4,6-dimethyl-2,3-epoxycyclohexyl-3',4'-epoxycyclohexylcarboxylate, 4,5-epoxytetrahydrophthalic anhydride, 3-t-butyl-4,5-epoxytetrahydrophthalic anhydride, diethyl-4,5-epoxy-cis-1,2-cyclohexylcarboxylate and di-n-butyl-3-t-butyl-4,5-epoxy-cis-1,2-cyclohexylcarboxylate. The amount of such epoxy stabilizers per 100 parts by weight of the thermoplastic resin is 0.0001~5 parts by weight, preferably 0.001~1 parts by weight, most preferred is 0.005~0.5 parts by weight.

The examples of mold lubricants are silicone mold lubricants like methylphenyl silicon oil; ester mold lubricant like pentaerythritol tetrastearate or glycerin monostearate, montan wax and olefin mold lubricant like poly α-olefin. The amount of addition of mold lubricant is 0.01~5 parts by weight, preferably 0.05~2 parts by weight and most preferred 0.1~1 parts by weight per 100 parts by weight of the thermoplastic resin.

The examples of ultraviolet absorbent are benzotriazole UV absorbent, benzophenone UV absorbent and salicylic acid UV absorbent.

The concrete examples of benzotriazole UV absorbent are 2-(2'-hydroxy-5'-methylphenyl) benzotriazol, 2-(2'-hydroxy-5'-t-butylphenyl) benzotriazol, 2-(2'-hydroxy-5'-t-octylphenyl) benzotriazol, 2-(2'-hydroxy-3',5'-di-t-butylphenyl) benzotriazol, 2-(2'-hydroxy-3',5'-di-amylphenyl) benzotriazol, 2-(2'-hydroxy-3'-dodecyl-5'-methylphenyl) benzotriazol, 2-(2'-hydroxy-3',5'-di-cumylphenyl) benzotriazol, 2,2'-methylene bis[4-(1,1,3,3-tetramethylbutyl)-6-(2H-benzotriazol-2-yl) phenol. Such benzotriazol UV absorbents are marketed as Cyasorb UV5411 by Cytec Industries and as Tinuvin234 by Ciba-Geigy. Benzotriazol UV absorbents are also marketed as UV531 by Cyanamid Co. Examples of salicylate UV absorbent are phenyl salicylate, p-t-butylphenyl salicylate and p-octylphenylsalicylate.

The amount of the UV absorbent per 100 parts by weight of the thermoplastic resin is 0.01~10 parts by weight, preferably 0.05~5 parts by weight.

There is no specific restriction on the method of preparation of thermoplastic resin and, any known method can be adopted. Specifically, fused mixing method, in other words, mixing the components by fusing, is preferable. A small quantity of solvent can also be used but usually it is not necessary. Apparatus like banbury mixer, roller, kneader can be used. These apparatus can be operated batchwise or continuously. There is no specific restriction on the mixing order of the components.

The thermoplastic resin composition of the invention is suitable for lenses of headlights of automobiles or covers or lenses of various lighting apparatus, transparent films or transparent sheets, base for optical disks or its cartridge, OA apparatus, office equipment, domestic electrical equipment, cases for storage or transport of molded articles, and specifically for automobile headlight lenses and lighting equipment or lenses.

Method for Improving Appearance

If the halogenated carbon sulfonate of polysubstituted phosphonium compound mentioned above is blended with thermoplastic resin, the appearance of the resulting molded object is improved.

In the method for improving the appearance, the amount of halogenated carbon sulfonate of polysubstituted phosphonium compound added is 0.0001 to 0.05% by weight, preferably 0.001 to 0.03% by weight to 100% by weight of the thermoplastic resin.

When halogenated carbon sulfonate of polysubstituted phosphonium compound is blended in this ratio, a molded product with no fern marks on the surface of the molded object is obtained.

The halogenated alkylsulfonate of polysubstituted phosphonium compound is the sulfonate phosphonium compound represented by formula (1) mentioned earlier.

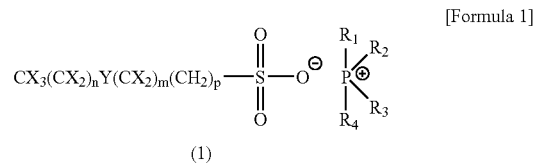

[Formula 1]

(1)

Wherein, X, n, m, p, Y, $R_1$, $R_2$, $R_3$ and $R_4$ have the same meaning as mentioned earlier.

The above mentioned thermoplastic resin can be selected from a group consisting of aromatic polycarbonate, polyetherimide, polyester, polyphenylene ether, polyphenylene ether/styrene polymer blend, polyamide, polyketone, acrylonitrile-butadiene-styrene, their blends and their blends with other substances. Specifically, transparent aromatic polycarbonate prepared by fusion method is preferred. The resin is described above.

Result of the Invention

The invention presents a method of obtaining a thermoplastic resin composition that can be molded into a product whose surface has improved appearance. The thermoplastic resin showing no fern marks on its surface can be obtained by adding a very small amount of halogenated carbon sulfonate of polysubstituted phosphonium compound.

Embodiment

The invention is explained with the help of following embodiments but is it not restricted to these examples.

Following raw materials were used in the embodiments.

Embodiments and comparative examples further explain the invention but it is not restricted to these examples.

[Polycarbonate]

Polycarbonate (1)

Bisphenol A and diphenyl carbonate were used as the raw materials, sodium hydroxide was used as the catalyst and polycarbonate was obtained by fused polymerization. This polymer in the molten state was fed into a biaxial extruder by a gear pump. Then p-toluene butyl sulfonate (its quantity used was 2 times that of sodium hydroxide) was added as the catalyst. By continuous mixing and kneading, strands were obtained by passing it through a die. The strands were then pelletized by cutting by means of a pelletizer (limiting viscosity was 0.47).

Polycarbonate (2)

Bisphenol A and diphenyl carbonate were used as the raw materials, sodium hydroxide was used as the catalyst and polycarbonate was obtained by fused polymerization. This polymer was fed into the biaxial extruder by a gear pump. Then p-toluene butyl sulfonate (its quantity used was 2 times that of sodium hydroxide) as the catalyst and 0.3 parts by weight of pentaerythritol tetrastearate per 100 parts by weight of polycarbonate were added simultaneously. Mixing and kneading was carried out and strands were obtained by passing it through a die. The strands were then pelletized by cutting by means of a pelletizer (limiting viscosity was 0.47).

The limiting viscosity of polycarbonate was measured in methylene chloride at 20° C. by Ubbelohde viscometer.

Halogenated Carbon Sulfonate of Polysubstituted Phosphonium Compound

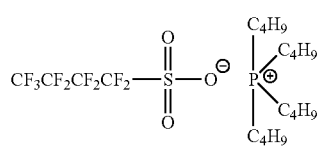

[Formula 12]

Nanoflouro-1-butanesulfonate tetrabutylphosphonium salt

Ultraviolet Absorbent 2-(2-hydroxy-5-t-octylphenyl) benzotriazole (Brand name: Cyasorb UV5411, Cytec Industries.

Mold Lubricants

Methylphenyl silicone oil (Brand name: TSF437, D.E. Toshiba Silicone Co.)

Stabilizer

Stabilizer (1): tris(2,4-di-t-butyphenyl) phosphite (Brand name: MK2112, Asahi Denka Co.)

Stabilizer (2): Octadecyl-3-(3,5-di-t-butyl-4-hydroxyphenyl) propionate (Brand name: MKAO0050 Asahi Denka Co.

Stabilizer (3): 3,4-epoxycyclohexylmethyl-3',4'-epoxycyclohexane carboxylate (Brand name: Seloxide2021P, Daicel Chemical Industries Embodiment 1~4 and Comparative Examples 1 and 2

Polycarbonate and additives were blended as shown in Table 1 and after mixing and blending by extruder, the mixture was pelletized.

By using the obtained pellets and by using a tray mold (length 300 mm×breadth 400 mm×depth 70 mm, thickness 3 mm) at preset temperature 280° C., tool temperature 80° C., injection molding was carried out.

Following evaluations were carried out for the molded objects.

Evaluation of Appearance

The tray-molded product was kept in a room for 2 weeks and the surface was visually observed. The evaluation was done in case of 5 molded articles to see how many of them had fern marks. Smaller number of pieces with fern marks or their ratio (%) shows less sticking of dirt.

The results are presented in Table 1.

TABLE 1

| | | Embodiment 1 | Embodiment 2 | Embodiment 3 | Embodiment 4 | Comp. Ex. 1 | Comp. Ex. 2 |
|---|---|---|---|---|---|---|---|
| Blending | Polycarbonate (1) | 100 | 100 | | | 100 | |
| | Polycarbonate (2) | | | 100 | 100 | | 100 |
| | UV absorbent | 0.27 | 0.27 | 0.27 | 0.27 | 0.27 | 0.27 |
| | Mold Lubricant | 0.3 | 0.3 | | | 0.3 | |
| | Stabilizer (1) | 0.08 | 0.08 | 0.08 | 0.08 | 0.08 | 0.08 |
| | Stabilizer (2) | 0.02 | 0.02 | 0.02 | 0.02 | 0.02 | 0.02 |
| | Stabilizer (3) | 0.02 | 0.02 | 0.02 | 0.02 | 0.02 | 0.02 |
| | Sulfonate phosphonium salt | 0.005 | 0.01 | 0.005 | 0.01 | — | — |
| Properties | No. of soiled molded products | 0/5 | 0/5 | 0/5 | 0/5 | 5/5 | 5/5 |
| | % of soiled molded products | 0 | 0 | 0 | 0 | 100 | 100 |

UV absorbent: 2-(2-hydroxy-5-t-octylphenyl) benzotriazole (Brand name: Cyasorb UV5411, Cytec Industries.
Mold Lubricant: Methylphenyl silicone oil (Brand name: TSF437, D.E. Toshiba Silicone Co.)
Stabilizer (1): Tris(2,4-di-t-butyphenyl) phosphite (Brand name: MK2112, Asahi Denka Co.)
Stabilizer (2): Octadecyl-3(3,5-di-t-butyl-4-hydroxyphenyl) propionate (Brand name: MKAO050 Asahi Denka Co.
Stabilizer 3): 3,4-epoxycyclohexylmethyl-3',4'-epoxycyclohexane carboxylate (Brand name: Seloxide2021P, Daicel Kaden Industries
Sulfonate phosphonium salt: Nonafluoro-1-butanesulfonate tetrabutylphosphonium salt

Means for Solving the Problems

Figure 1:
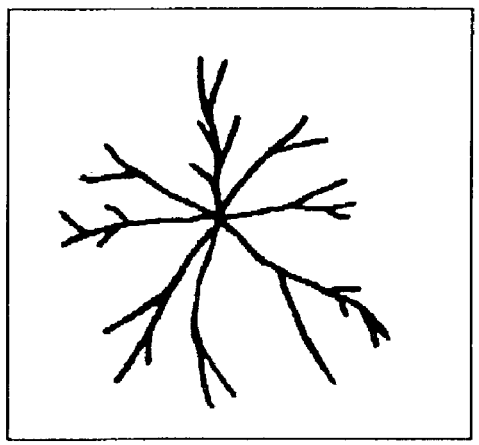
FIG. 1: Pattern showing fern marks on the surface of conventional molded product.
Figure 1:
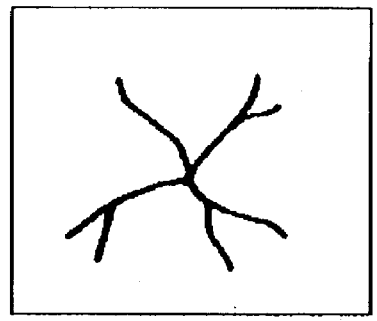
Figure 1:
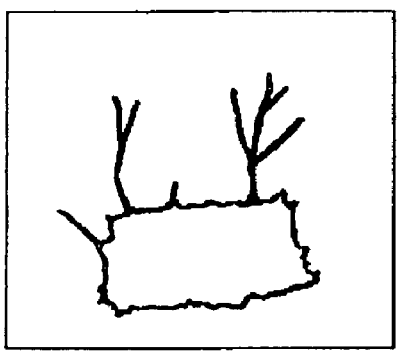
Figure 1:
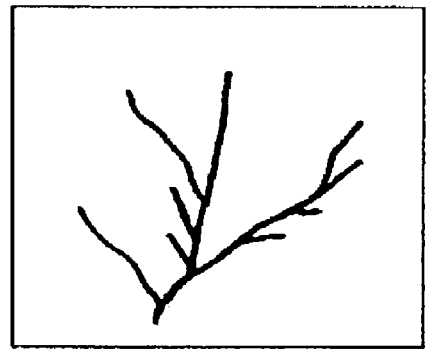

A thermoplastic resin composition containing 0.001~0.05% by weight of halogenated carbon sulfonate of polysubstituted phosphonium compound per 100% by weight of thermoplastic resin.

Method for improving appearance of molded product by adding 0.001~0.05% by weight of halogenated carbon sulfonate of polysubstituted phosphonium compound per 100% by weight of thermoplastic resin.

What is claimed is:

1. Thermoplastic resin composition comprising 0.0001 to about 0.05% by weight of halogenated carbon sulfonate of a polysubstituted phosphonium compound per 100% by weight of a thermoplastic resin comprising an aromatic polycarbonate prepared by the fusion method.

2. Thermoplastic resin composition comprising 0.0001 to about 0.001% by weight of halogenated carbon sulfonate of polysubstituted phosphonium compound per 100% by weight of a thermoplastic resin comprising an aromatic polycarbonate prepared by the fusion method.

3. Thermoplastic resin composition of claim 1, wherein the halogenated carbon sulfonate of polysubstituted phosphonium compound is sulfonic acid phosphonium compound represented by the following formula (1):

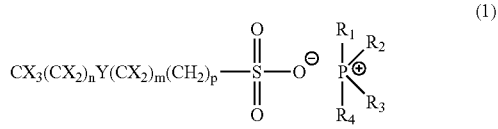

(1)

wherein, X represents any one selected from a group of halogen and hydrogen, where X may or may not be the same, with the proviso that at least one of X is halogen, n, m and p varies from 0 to 12, Y is either absent or it is selected from a group consisting of heterocyclic group, nitrogen, oxygen, sulfur, selenium, phosphorous and arsenic, $R_1$, $R_2$ and $R_3$ may be the same or different, and are selected from aliphatic hydrocarbon having 1 to 8 carbon atoms and aromatic hydrocarbon with 6 to 12 carbon atoms and $R_4$ represents a hydrocarbon group with 1 to 18 carbon atoms.

4. Thermoplastic resin composition of claim 3, wherein X is fluorine.

5. Thermoplastic resin composition of claim 3, wherein n is 3 and $R_1$, $R_2$ and $R_3$ are individually alkyl groups with 4 carbon atoms, Y is absent and m and p are 0.

6. Thermoplastic resin composition comprising 0.0001 to about 0.03% by weight of halogenated carbon sulfonate of a polysubstituted phosphonium compound per 100% by weight of a thermoplastic resin comprising an aromatic polycarbonate prepared by the fusion method.

7. Method for improving fern marks of a molded product by adding 0.0001 to about 0.05% by weight of a halogenated carbon sulfonate of a polysubstituted phosphonium compound to 100% by weight of a thermoplastic resin comprising an aromatic polycarbonate prepared by the fusion method.

8. Method for improving fern marks of a molded product by adding 0.0001 to about 0.001% by weight of a halogenated carbon sulfonate of a polysubstituted phosphonium compound to 100% by weight of thermoplastic resin comprising an aromatic polycarbonate prepared by the fusion method.

9. Method for improving fern marks of a molded product of claim 7, wherein the halogenated alkyl sulfonate of a polysubstituted phosphonium compound is a sulfonic acid phosphonium compound represented by the following formula (1):

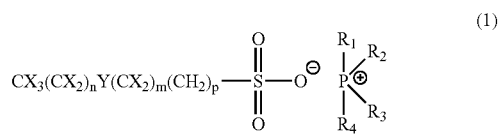

(1)

wherein, X is selected from a group of halogen and hydrogen where X may or may not be the same, with the proviso that at least one of X is halogen, n, m and p have the values between 0 and 12, Y is either absent or it selected from a group consisting of heterocyclic group, nitrogen, oxygen, sulfur, selenium, phosphorous and arsenic, $R_1$, $R_2$ and $R_3$ may be the same or different, and are selected from aliphatic hydrocarbon with 1 to 8 carbon atoms and aromatic hydrocarbon with 6 to 12 carbon atoms and $R_4$ represents hydrocarbon with 1 to 18 carbon atoms.

10. Method for improving fern marks of a molded product of claim 9, wherein X is fluorine.

11. Method for of improving fern marks of a molded product of claim 9, wherein n is 3 and $R_1$, $R_2$ and $R_3$ and $R_4$ are alkyl groups with 4 carbon atoms respectively, Y is absent and m and p are 0.

* * * * *